Patented June 10, 1924.

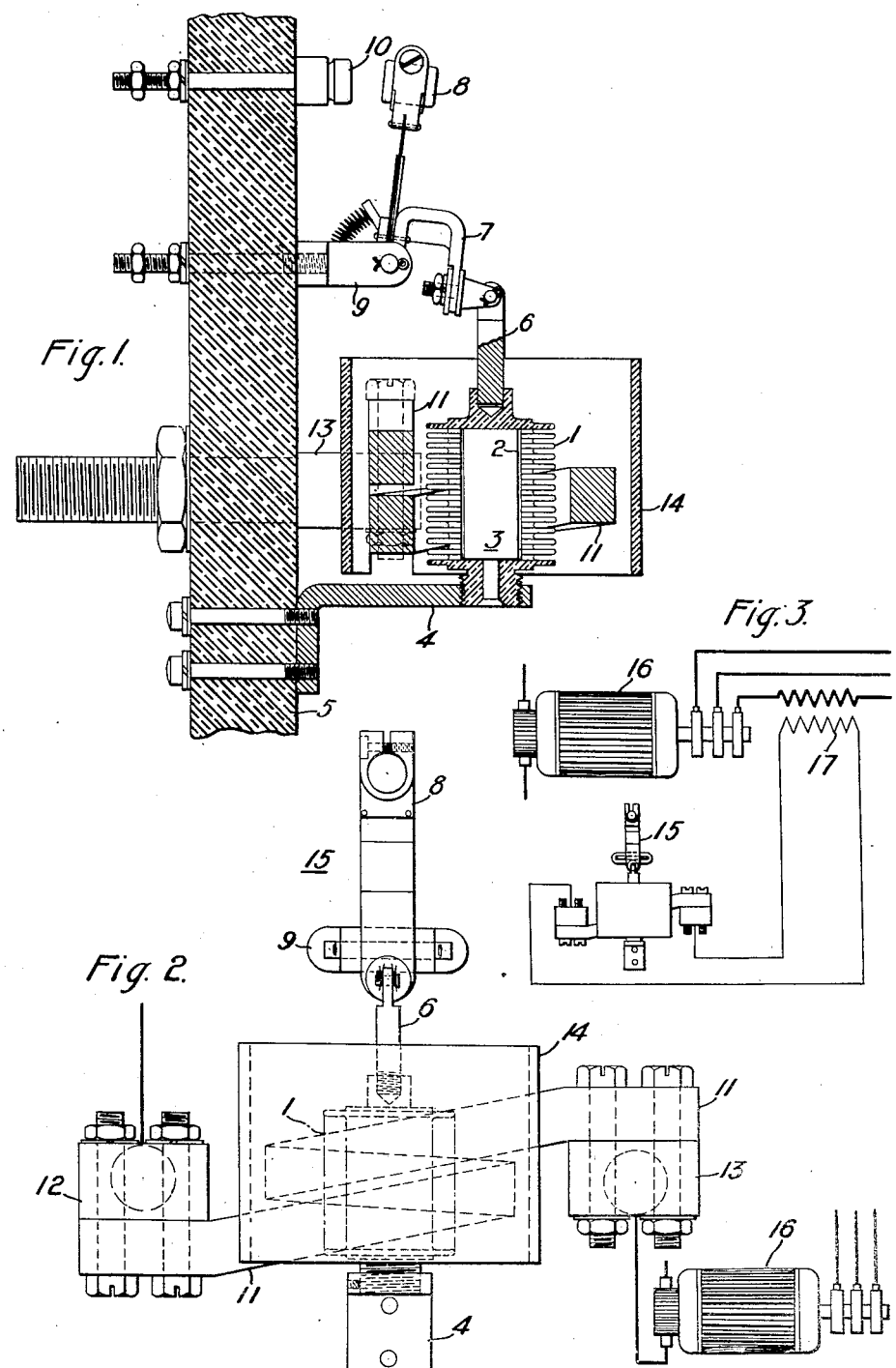

1,497,419

UNITED STATES PATENT OFFICE.

ROY J. WENSLEY, OF EDGEWOOD PARK, PENNSYLVANIA, ASSIGNOR TO WESTINGHOUSE ELECTRIC & MANUFACTURING COMPANY, A CORPORATION OF PENNSYLVANIA.

THERMAL RELAY.

Application filed October 6, 1919. Serial No. 328,741.

*To all whom it may concern:*

Be it known that I, ROY J. WENSLEY, a citizen of the United States, and a resident of Edgewood Park, in the county of Allegheny and State of Pennsylvania, have invented a new and useful Improvement in Thermal Relays, of which the following is a specification.

My invention relates to protective relays and particularly to thermal relays.

One object of my invention is to provide a thermal relay that shall have sufficient time interval in the operation thereof to protect electrical apparatus from overload.

Another object of my invention is to provide a thermal relay that shall have a temperature gradient substantially in accordance with the temperature gradient of the apparatus to be protected.

A further object of my invention is to provide a thermal relay that shall be simple and rugged in construction, and reliable and effective in operation.

Heretofore, various types of thermal relays have been made but they have required the use of an additional switch or relay having sufficient current-carrying capacity to accommodate a current for energizing control or regulating apparatus.

In practising my invention, I provide a copper bellows of cylindrical shape containing a volatile fluid, a conductor surrounding the bellows, a micarta or other suitable tube for enclosing the bellows and the conductor to retain the heat radiated from the conductor, a stationary contact member and a movable contact member actuated by the bellows, to engage the stationary contact member when the bellows has been heated to a predetermined degree.

In the accompanying drawings, Figure 1 is a side view partially in section and partially in elevation, of a relay embodying my invention. Fig. 2 is a front view in elevation of the relay, shown in Fig. 1, in a circuit of a rotary converter, and Fig. 3 is a diagrammatic view illustrating the connections of the relay to a current transformer in a circuit of a rotary converter.

A bellows 1 of cylindrical shape, enclosing a cylinder 2, and containing a volatile fluid 3, is supported at the bottom by an angular member 4 mounted on a base 5. The cylinder 2 serves as a mechanical spacer to preclude a collapse of the bellows 1. A short rod 6 mounted on the top of the bellows 1, extends to an arm 7 that is pivotally connected to the rod 6 and is pivotally mounted on a bracket 9. A movable contact member 8 is resiliently mounted on the member 7 and is adapted to engage a stationary contact member 10 that is mounted on the base 5, vertically above the bracket 9. A coil 11, surrounding the bellows 1, terminates at two terminals 12 and 13 that are mounted, on opposite sides of the bellows 1, on the base 5. A micarta tube 14 encloses the bellows 1 and the conductor 11 between the terminals 12 and 13. In Fig. 2, a relay 15 is shown in the direct-current circuit of a rotary converter 16. In Fig. 3, a relay 15 is shown in the secondary circuit of a current transformer 17 that is in the alternating-current circuit of a rotary converter 16.

The conductor 11 is adapted to be connected either in the main circuit or in the circuit of a current transformer 17 associated with the main circuit of a rotary converter or other device to be protected and carries the full current or a current proportional to the full current of the rotary converter or other device. The heat generated by the current through the coil 11, is radiated from the coil 11 and is absorbed by the bellows 1. The micarta tube 14 enclosing the bellows 1 and the coil 11, prevents excessive convective currents. The heat absorbed by the bellows 1 is conducted to the volatile fluid 3 in the bellows and causes it to volatilize. The vapor pressure induced by the absorbed heat actuates the rod 6, through the expansion of the bellows, to effect engagement of the contact members 8 and 10, thus completing the circuit to external control apparatus (not shown).

The time lag in the operation of the relay is of such value as to adequately protect the apparatus to which it is connected. It is constructed with a time factor equal to about one-half that of the apparatus to which it is connected. Of course, the ideal case would be to cause the coil 11 to have the same temperature characteristics as the apparatus to be protected, but, for commercial reasons, this is impractical, and, consequently, the relay is so adjusted as to provide a safe time limit for the apparatus to be protected.

In the accompanying drawings, I show the preferred form of a relay embodying my invention, but I do not limit the relay to the form shown, as various modifications may be made in the structure thereof without departing from the scope and spirit of the invention as set forth in the appended claims.

I claim as my invention:

1. The combination with a bellows member and a switch actuated thereby, of a heating means surrounding the bellows member, and a heat-retaining casing around the heating means.

2. The combination with a bellows member and a switch actuated thereby, of a fluid enclosed in the bellows member, a heating means surrounding the bellows member, and a heat-retaining casing around the heating means.

3. The combination with a bellows member and a switch actuated thereby, of a coiled conductor surrounding the bellows member, and a casing around the conductor.

4. The combination with a bellows member and a switch actuated thereby, of a base, a bracket mounted on the base for supporting the bellows member, a heating means surrounding the bellows member, and a heat-retaining casing around the heating means.

5. The combination with a bellows member and a switch actuated thereby, of a coiled conductor surrounding the bellows member, terminals for the conductor and a casing around the conductor.

6. A relay switch comprising an expansible member, a switching device, means normally maintaining the switch in open position and means pivotally mounted on the expansible member for actuating the switch.

7. A relay switch comprising an expansible member, a switching device comprising a stationary and a movable contact member, a supporting bracket for the movable contact member, a movable member pivoted on the supporting bracket and operable to control the movable contact member, and means operatively disposed between the expansible member and the movable pivoted member for controlling the actuation of the movable contact member.

8. A relay switch comprising an expansible bellows member, a swiching device to be controlled thereby and comprising a stationary contact member and a movable contact member, a supporting bracket for the movable contact member, a control spring for normally maintaining the movable contact member in a predetermined position, and a controlling member pivoted upon the supporting bracket and operable by a predetermined movement of the bellows member for actuating the movable contact member.

In testimony whereof, I have hereunto subscribed my name this 30th day of Sept. 1919.

ROY J. WENSLEY.